Feb. 28, 1939.         E. CANNON         2,148,855
GUIDE FOR RECIPROCATING PLATENS
Filed Oct. 3, 1936
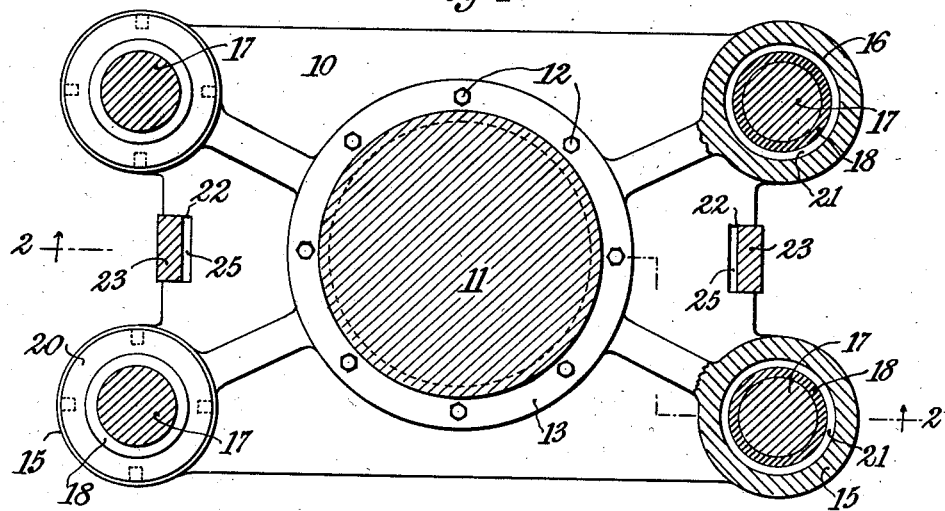
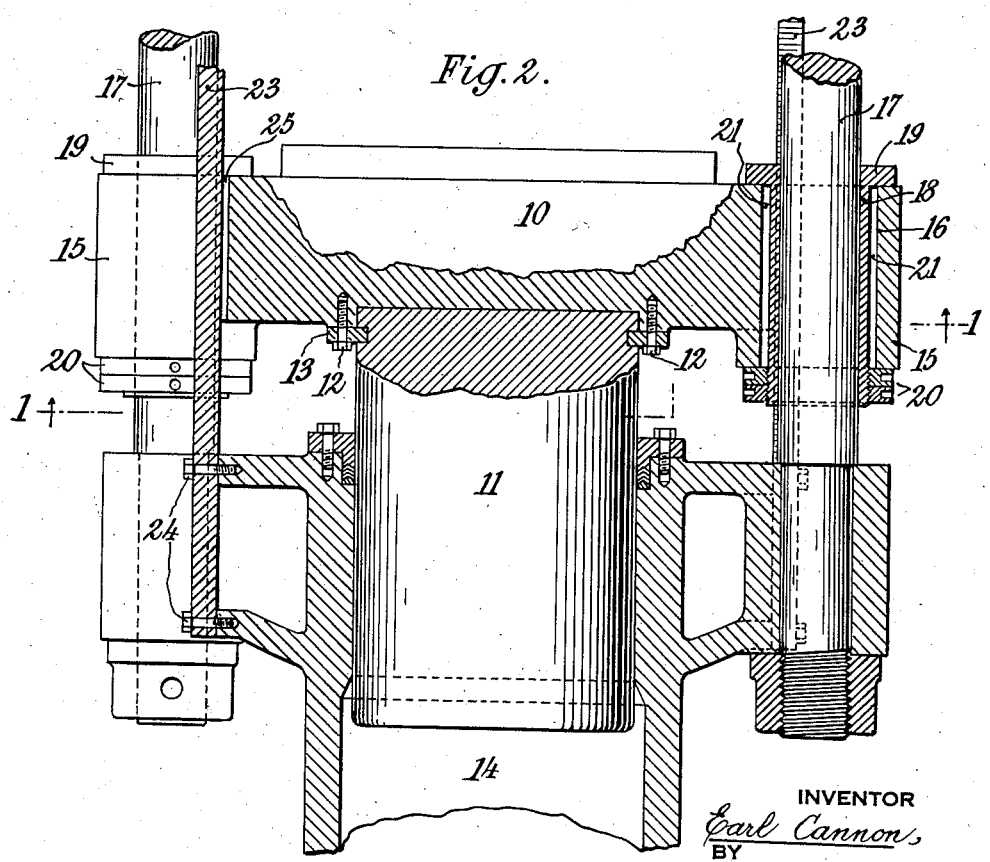
INVENTOR
Earl Cannon
BY
Fraser, Myers & Manley
ATTORNEYS Patented Feb. 28, 1939

2,148,855

UNITED STATES PATENT OFFICE 2,148,855

GUIDE FOR RECIPROCATING PLATENS

Earl Cannon, Rockville Centre, N. Y., assignor to E. W. Bliss Company, Brooklyn, N. Y., a corporation of Delaware Application October 3, 1936, Serial No. 103,820

6 Claims. (Cl. 308—4)

This invention relates to improvements in guides for reciprocating platens, and is described and illustrated herein and in the accompanying drawing as embodied in a hydraulic press adapted for the hot molding of various plastic materials into desired commercial shapes.

In molding such materials it is customary to utilize a hydraulic press for applying pressure to cause the plastic mass to flow into and to conform to the shape of suitable molds and also to maintain pressure upon the molds while the plastic material sets to the desired shape. Temperatures of 350 degrees F. or more are used and the material, depending upon its precise character, is either heated or chilled to cause it to set. These substantial temperature variations are communicated in a great measure to the platen and hence, it is necessary that provision be made for the expansion and contraction thereof.

The platen has heretofore been guided centrally in such presses, by the ram on which it was mounted and at or near its periphery, by the posts of the press, it being necessary to provide a clearance between said posts and the platen, to permit expansion and contraction of the latter and to prevent binding when the platen was heated. Thus the said clearances, if sufficient to prevent binding when heated, were such that, when the platen was at a relatively low temperature and in a substantially contracted condition, it could rotate slightly in a horizontal plane and could also tilt to some extent if subjected to pressure when unequally loaded.

The molding industry, by reason of the foregoing circumstances, has heretofore been substantially limited to the production of goods where the inaccuracies inherent in the operation of such prior presses were of little or no consequence with reference to the particular product. There are, however, many products which require accuracy in their proper production and which could not be satisfactorily produced by molding in said prior presses.

The principal object of the present invention is the provision of adequate guiding means for platens in molding presses to permit contraction and expansion of such platens without binding, while restricting them against objectionable tilting or horizontal shifting or rotation.

Another object is to provide such guiding means which may be easily and economically readjusted or replaced to compensate for wear therein and further objects will be apparent from a reading of the present specification.

The foregoing objects are achieved by my invention as described herein and illustrated in the accompanying drawing, in which:

Figure 1 is a plan view of the under side of a platen, partly broken away to sectionally show a detail, this figure being on the line 1—1 of Fig. 2.

Figure 2 is a vertical section on the line 2—2 of Fig. 1.

The platen 10 is rigidly fastened to the ram 11 and preferably centered thereon by any suitable means which may comprise machine bolts 12 extending through a collar 13 fixed to the ram near the upper end thereof, thence being threaded into the under side of the platen to secure the latter to the ram. The ram 11 is accurately fitted into the hydraulic cylinder 14, both of which are preferably centered in the press.

Although the ram thus affords central guidance for the platen, the latter, without additional guiding means, would be free to rotate horizontally and would have a tendency to tilt if subjected to pressure when loaded unequally. I therefore provide means for restraining the platen against such objectionable rotation and tilting.

The platen 10 is provided at its periphery with slideways 15 having vertical bores 16 within which the vertical posts 17 of the press frame extend. There is a substantial space between the walls of the bore 16 and the posts 17 which permits the fitting thereinto of a bushing 18. This bushing is accurately fitted to the post 17 to slide thereon, but there is a sufficient clearance as at 21 between the bushing and the slideway 15 to permit any horizontal expansion or contraction of the platen which may occur in practice. The bushing 18 has a flange 19 at its upper end extending beyond the edges of the said bore and slidably seating upon the upper surface of the platen while the lower end of the said bushing extends below the under surface of the slideway 15 and is exteriorly threaded to receive lock nuts 20 which may be tightened to slidably seat upon said under surface, thus permitting the bushing and post to slide horizontally relatively to the platen.

It will be observed that the bushing 18, with the flange 19 and lock nuts 20 (which also function as a flange) form a unit which, as a result of the accurate fit thereof to the post 17, may not tilt relatively thereto; and as the flange 19 and the lock nuts 20 intimately embrace the upper and lower horizontal surfaces of the platen, it follows that the latter likewise will be restrained against tilting while being free, in consequence of the clearance 21, to contract and expand horizontally with variations in its temperature.

Although the guiding means thus far described provide for the centering of the platen and prevent it from tilting if unequally loaded, the platen may nevertheless rotate about the axis of the ram within the limits of the clearance 21. To prevent this rotation, I provide vertical rectangular grooves 22 at the center line on opposite sides of the platen and vertical guides 23 fixedly mounted upon the press frame as by machine screws 24 or in any other suitable manner. The guides 23 closely engage the sides of the grooves 22 and thus restrain the platen against rotation. The guides 23, however, are so disposed that they do not seat upon the base of said grooves, the clearance at those points, indicated at 25, being sufficient to permit any horizontal expansion or contraction across the center line of the platen which may be encountered in practice. As the grooves 22 are quite remote from the source of heat the expansion and contraction, if any, between the sides of the said grooves is negligible and limited, in any event, to whatever slight expansion and contraction may occur across the width of said grooves. Incidentally, if expansion occurs at the grooves 22, the fact that they are at the center line of the platen results in any such expansion being equally distributed toward both sides of the grooves, and hence, avoids any objectionable rotary movement resulting from variations in the temperature of the platen.

The vertical guides, if they should become worn, may be easily replaced by new guides. Any wear which may occur in the bushings would ordinarily take place at one point or opposite points therein, and the said bushings may be loosened by loosening of the lock nuts 20, then turned a quarter turn and tightened in such new position to avail of new surfaces, thus deferring the necessity of fitting new bushings into place and minimizing the expense of servicing the press.

My invention thus provides means whereby the platen is centered and is restrained against both tilting and horizontal rotation. Obviously, a variety of means may be employed to achieve these results without departing from the spirit of the invention as defined in the appended claims.

What I claim is:

1. A guide for a reciprocating platen comprising a fixed post disposed adjacent the platen and substantially parallel to the line of movement thereof, with sufficient clearance relatively to the platen to allow for expansion and contraction thereof, a guide element accurately fitted to said post to slide thereon and being substantially non-tiltable relatively thereto, the said element having a protruding portion with a plane surface perpendicular to said post extending over a portion of the platen, the said portion of the platen also having a plane surface perpendicular to said post, and means for slidably holding said plane surfaces on the guide element and the platen in intimate engagement.

2. A guide for a reciprocating platen comprising a bore extending through the platen in a line substantially parallel with the line of movement thereof, a fixed post and a flanged bushing thereon, both extending through said bore, with sufficient clearance between the bushing and the walls of the bore to allow for expansion and contraction of the platen, the bushing being accurately fitted to said post to slide thereon, and being substantially non-tiltable relatively thereto, and having spaced-apart flanges with opposed plane surfaces perpendicular to said post extending about the adjacent portion of the platen, and the said portion of the platen also having plane surfaces perpendicular to said post, the latter plane surfaces being intimately and slidably engaged within the opposed plane surfaces of the bushing.

3. A guide for a reciprocating platen according to claim 2 wherein one of the flanges of the bushing is a nut adapted to be screwed onto one end of the bushing and tightened thereon to hold the said plane surfaces of the platen and bushing in intimate slidable engagement and wherein the post is round in cross-section and the bushing is adapted to be turned about its longitudinal axis when partially worn to present new surfaces at the points where most wear has previously occurred.

4. Platen guiding means wherein a plurality of guides according to claim 2 are oppositely disposed at the periphery of the platen whereby to provide restraint against tilting of the platen on opposite sides of the load-carrying portion thereof.

5. In combination, a guide according to claim 2, a reciprocating ram centrally connected to the platen, a hydraulic cylinder within which the ram is accurately fitted and guided and a groove and fixed guide bar at the periphery of the platen disposed substantially parallel to the line of movement thereof, the sides of the groove being substantially parallel to each other and to a plane passing through a substantially central portion of the platen, the sides of the groove and the adjacent portions of the guide bar being in intimate slidable engagement and there being sufficient clearance between the guide bar and the base of the groove to permit expansion and contraction of the platen, the foregoing combining to centrally guide the platen and to restrain the latter against both tilting and rotation.

6. A guide for a reciprocating platen element comprising a fixed post disposed adjacent the platen element and substantially parallel to the line of movement thereof, with sufficient clearance relatively to the platen element to allow for expansion and contraction thereof, a guide element accurately fitted to said post to slide thereon and being substantially non-tiltable relatively thereto, the said elements having plane surfaces, in intimate slidable engagement and perpendicular to said post, and means for slidably holding said plane surfaces in intimate engagement.

EARL CANNON.